April 26, 1966

R. W. GOODE 3,247,934

VENTILATED BRAKE DISC

Filed May 13, 1963

INVENTOR.
ROBERT W. GOODE
BY
ATTORNEY

April 26, 1966 R. W. GOODE 3,247,934
VENTILATED BRAKE DISC
Filed May 13, 1963 3 Sheets-Sheet 2

INVENTOR.
ROBERT W. GOODE
BY
Julian Caplan
ATTORNEY

April 26, 1966  R. W. GOODE  3,247,934
VENTILATED BRAKE DISC
Filed May 13, 1963  3 Sheets-Sheet 3
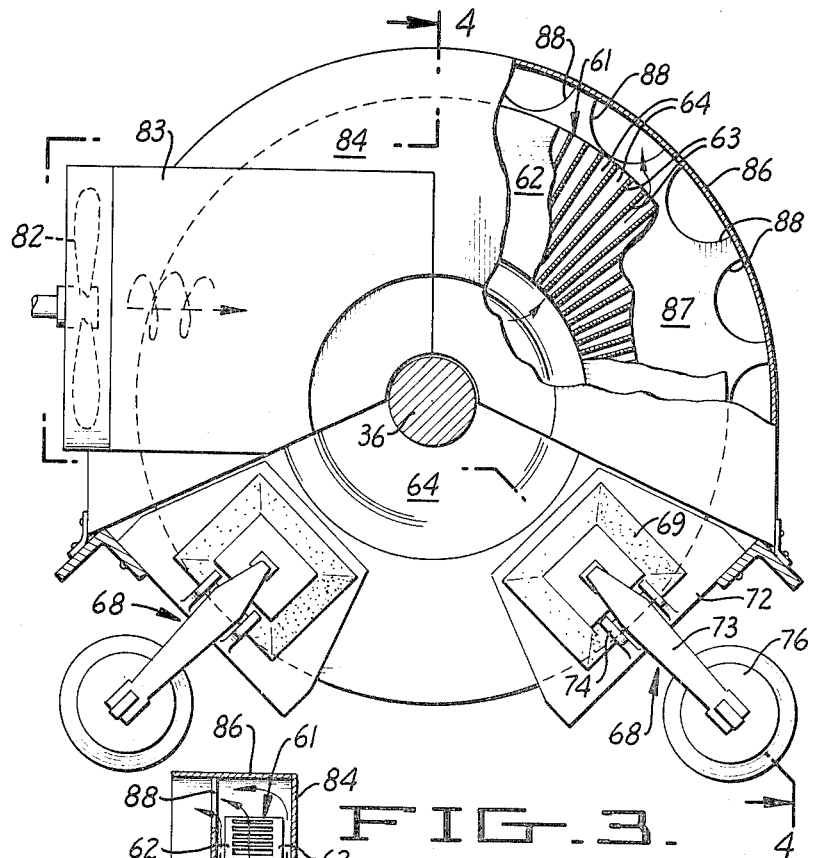
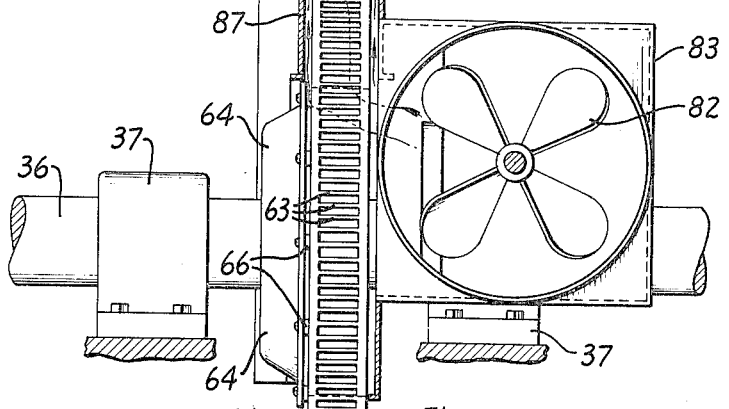
INVENTOR.
ROBERT W. GOODE
BY
Julian Caplan
ATTORNEY

United States Patent Office 3,247,934
Patented Apr. 26, 1966

3,247,934
VENTILATED BRAKE DISC
Robert W. Goode, Morgan Hill, Calif., assignor, by mesne assignments, to Anita E. Petersen, Saratoga, Calif.
Filed May 13, 1963, Ser. No. 279,876
5 Claims. (Cl. 188—264)

This invention relates to a new and improved tension stringing machine with ventilated brake disc. More particularly, the invention relates to a machine used in stringing conductors and cables wherein a brake disc is cooled by air blown through passages in and around the disc. Further, the invention involves a transmission mounting interposed between the tensioner engine and main drive shaft which is so constructed as to accommodate expansion and contraction of the transmission as the temperature thereof varies and further accommodates twisting and other stresses which might otherwise result in misalignment of the machine drive.

Tension stringing of electrical conductors maintains the conductors in the air at all times to avoid damage. A pulling line or cable of wire or fiber rope, or the like, is attached to the leading end of the conductor and is then run through stringing sheaves attached to the crossarms of the poles or towers. In the course of operation, a tension puller machine is attached at one end of the line and a tension braking machine at the opposite end. Each of these machine is equipped with bull wheels around which the pulling line or conductor is reeved. The bull wheel of the tensioner puller is equipped with power for turning with a force greater than the braking action at the other end of the line. The brake machine has a disc engaged by shoes which applies the necessary frictional braking force. If the equipment is properly operated, the conductor never touches the ground at any time during the stringing operation. Hence, damage to the conductor is avoided, which is of importance in that damage to the surface of the conductor results in corona loss and also sets up interference when the conductor transmits high voltages. Further, the use of tension stringing avoids obstructions such as pre-existing power and telephone lines, roads, streets and railroad tracks which must be traversed by the line being strung.

The present invention provides a machine which may be used either for pulling or braking as required. For such purpose, an engine is mounted on the machine intended primarily to drive the bull wheels for the pulling operation but which also may be used during braking to overcome starting inertia. The machine is also provided with a specially constructed brake disc ventilated by a small engine driving a fan which blows air through sheet metal ducts into and around the disc.

A principal purpose of the present invention is to provide a machine constructed for versatile operation in that it may be used for pulling or braking as the particular installation requires. For such purpose, the engine may be used either to pull or to overcome inertia during braking. In some instances, it may be desirable to use the braking force of the engine as an auxiliary to the friction brake.

Interconnecting the engine and the main shaft which drives the bull wheels is a gear-type transmission. Such transmission has shafts for the gears which are transverse to the direction in which the cable or conductor is strung and are located in a line extending longitudinally of the machine. The transmission is enclosed in a casing fixed at one end to the main drive shaft of the machine and supported at its other end by a vertically disposed, transverse plate or bracket which may flex to permit longitudinal expansion and contraction of the transmission as its temperature and other conditions cause variations in length and position thereof. The end of the transmission supported by the aforementioned bracket or plate is connected to the drive shaft of the engine by a flexible coupling which permits movement of the casing. The foregoing mounting provides a rigid interconnection of the shafts of the two bull wheels and of the main shaft of the machine which may be supported from the frame of the machine by bracing so that the aforementioned three shafts are, for practical purposes, fixed relative to each other and relative to the main frame of the machine. Thus, the very considerable stresses imposed upon the alignment of the three shafts is adequately accommodated. At the same time, the engine is rigidly mounted on the same frame but the interconnection between the main shaft of the machine and the engine drive shaft is, as has heretofore been explained, sufficiently flexible to permit expansion, contraction, and flexing under the stresses imposed upon the equipment.

When the machine is used as a brake, the friction of the brake shoes upon the brake disc generates considerable heat. The present invention involves an improved means for dissipating the heat. Accordingly, the brake disc comprises two parallel, annular face plates spaced apart by radial vanes. Means is provided for forcing fan driven air into the central opening of one disc and outward through the radial ducts between the vanes. Simultaneously, air is blown radially outwardly along the exposed surfaces of each of the two face plates making up the member. This arrangement improves the heat dissipating performance of the brake.

Other objects of the present invention will become apparent upon reading the following specification and referring to the accompanying drawings in which similar characters of reference represent corresponding parts in each of the several views.

In the drawings:

FIG. 3 is an enlarged side elevational view of the brake disc and its associated equipment, partially broken away in section to reveal interior construction.

FIG. 4 is a sectional view taken substantially along the line 4—4 of FIG. 3.

Figure 1:
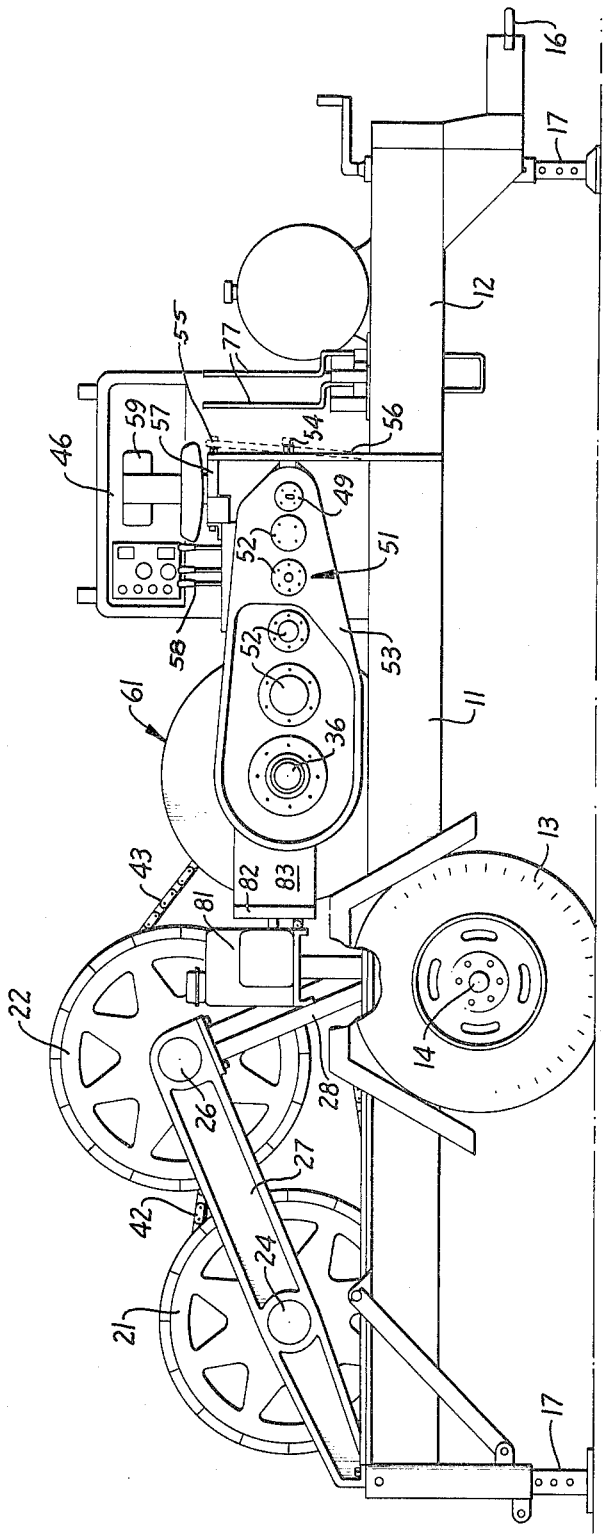
FIG. 1 is a side elevation of a machine in accordance with this invention.
Figure 2:
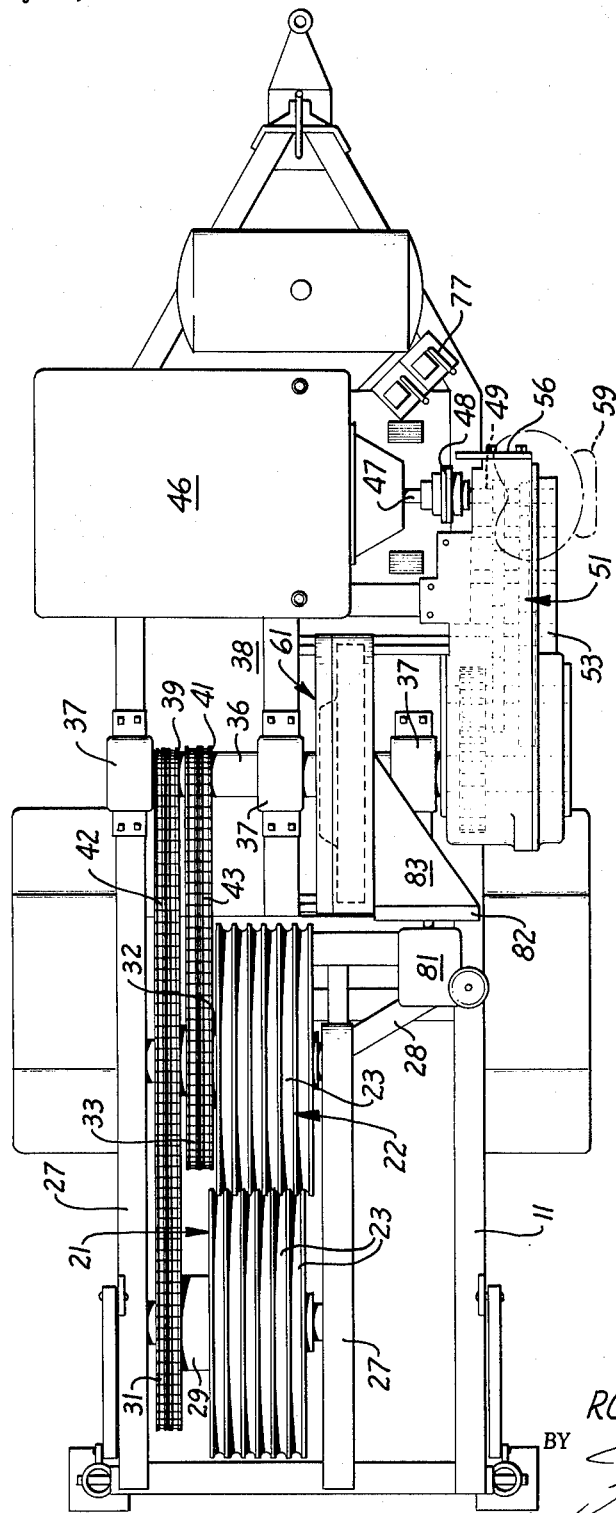
FIG. 2 is a top plan thereof.

The machine shown in the accompanying drawing is, as has been explained, useful either to pull or to brake cable or conductors. A main frame 11, which is longitudinally, horizontally disposed, provides a mounting for the equipment hereinafter described. Frame 11 is rigidly cross-braced and tapers inwardly at the front thereof. Although frame 11 may be mounted on a truck body or trailer body, it is more conveniently transported as a trailer by towing from a truck or tractor. For such purpose, wheels 13 on transverse axle 14 support the weight during transportation and a pulling eye 16 is fixed at the forward end of the trailer. Ground support jacks 17 are located at front and back of the trailer to brace the frame 11 against tilting when the machine is in position for operation.

Mounted on frame 11 are first and second bull wheels 21, 22, preferably of the type shown in Petersen Patent No. 2,954,702. The grooves 23 in the bull wheels are staggered one-half the diameter thereof, to permit proper reeving of the cable or conductor which is passed around the wheels. Bull wheels 21, 22, are mounted for rotation relative to transverse horizontal shafts 24, 26, respectively. Shafts 24, 26 are rigidly supported by longitudinally disposed slanted frame members 27 on either side of the bull wheels which are rigidly fixed to the trailer body 11. Frame members 27 are also laterally supported by brace 28 likewise fixed to frame 11. Wheel 21 has a hub 29 which carries sprocket 31. Similarly, wheel 22 has a hub 32 carrying sprocket 33. Sprockets 31, 33 are displaced laterally on the machine. Likewise, rigidly mounted on frame 11 is a horizontal transverse main shaft 36 supported by means of pillow blocks 37 on a horizontal platform 38 rigidly tied into the frame of the machine. Shaft 36 carries sprockets 39, 41, which are interconnected to sprockets 31, 33, respectively, by chains 42, 43, respectively. Wheels 21, 22 and shaft 36 are interconnected by the chain drive heretofore described so that they turn together although the rotation of shaft 36 is at considerably higher speed than wheels 21, 22. Shaft 36, being the main drive shaft of the machine, is power-driven when the machine is used as a puller and is braked when the machine is used for braking.

For power transmission purposes, there is mounted adjacent the forward end of the machine an internal combustion engine 46 of a heavy duty type. Engine 46 is rigidly mounted to frame 11 but independently of the mounting for shafts 24, 26 and 36. A principal feature of the mounting of this machine is the fact that the three shafts 24, 26, 36 are in a rigid triangular pattern as viewed in side elevation and are rigidly interconnected with the frame 11 so that the forces imposed thereon during the stringing operation caused them to flex as a unit independently of engine 46. Accordingly, the drive shaft 47 of engine 46 is attached to a flexible coupling 48 of a type commercially available. The opposite side of coupling 48 is connected to the input shaft 49 of a transmission 51, also commercially available. The various shafts 52 of transmission 51 are all transversely horizontally disposed within horizontal, longitudinally located transmission casing 53. The output of transmission 51 is main drive shaft 36. The details of construction of transmission 51 are not herein set forth in detail, it being understood that a considerable gear reduction is incorporated therein. One end of transmission casing 53 is mounted on and rigidly supported by shaft 36 and hence is fixed relative to the triangular pattern of shafts 24, 26, 36. The forward end of casing 53 is bolted by means of bolts 54 to a vertical plate or bracket 56, the lower end of which is welded to frame 11. An auxiliary mounting bracket 57 is also bolted by means of bolts 55 to the upper end of bracket 56 and is, in turn, connected to casing 53 and supports operator's seat 59. It will be understood that the gear drive within transmission 51 generates considerable heat as the machine works and, further, that stresses are imposed on the bull wheels 21, 22 by the stringing operation which causes the shaft 36 to flex relative to stationary engine 46. Directing attention now to FIG. 1, it will be seen that the vertical plate 56 may, in turn, bend in a longitudinal direction as shown by contrasting the solid line and dotted line positions of plate 56. Flexible coupling 48 permits such accommodation without misalignment. The advantages of the mounting heretofore described has been set forth in detail at an earlier point in this specification.

Engine 46 is intended primarily to drive bull wheels 21, 22 when the machine is used for pulling purposes and such purpose is accomplished by means of the transmission 51. A reverse gear lever 58 may be used to drive bull wheels 21, 22 in an opposite direction at the start of a braking operation in order to overcome inertia, the engine 46 being discontinued from the drive after the braking operation has been initiated. In some instances, it may be desirable also to use engine 46 as an auxiliary brake.

The braking operation of the machine is, however, primarily performed by brake 61 on shaft 36. Brake 61 consists primarily of a pair of spaced, parallel, annular face plates 62 which are spaced apart by radial vanes 63, leaving radial ducts 64 therebetween. Inside face plate 62 is fastened to shaft 36 by hub 64, with spacers 66 leaving a gap of about 1/8-inch between most of the periphery of hub 64 and plate 62. There is an annular gap between shaft 36 and outer plate 62. Two brakes 68 are located for engagement with plates 62. Brakes 68 have shoes 69 having lining 71 which may be brought into frictional engagement with the exposed surfaces of plate 62. Shoes 69 are mounted in yoke 72 for engagement by pivoted lever 73 pinner to yoke 72 by pin 74. Fluid brake actuator 76 is interposed between the opposite ends of levers 73, whereby upon expansion of actuator 73 the shoes 69 are brought together so that lining 71 frictionally engages disc 62, whereby contraction of actuator 76 spreads the shoes 71 apart. Actuator 76 may be supplied with hydraulic fluid from pumps 77 located adjacent seat 59.

It is apparent that the braking action generates a considerable amount of heat which must be dissipated. For such purpose there is mounted on the frame 11 a small internal combustion engine 81 which drives a propeller type blower or fan 82 at one end of longitudinal ventilating duct 83. Duct 83 slants laterally forwardly and is connected to sector-shape front 84 of a sheet metal ventilating casing which encloses at least a portion of brake 61. Front 84 has an arcuate periphery of slightly greater radius than plate 62 and has an included angle of about 240°. Front casing member 84 is spaced from the outer surfaces of outside face plate 62 with a gap of about 1/8". This gap permits radial outward flow of part of the air over the outer surface of outer plate 62. However, the main flow of the outlet of fan 82 is through the gap between shaft 36 and plate 62 and into the interior of brake 61 where entrance is obtained to ducts 64 and air is driven radially outwardly to the arcuate outer rim 86 of the casing. The back 87 of the casing is cut away in scallops 88 at the periphery to permit egress of air. At the same time, back casing member 87 is likewise separated from back plate 62 by a slight gap which permits a fraction of the air to blow radially outwardly through the gap between hub 64 and back plate 62 and thence through the gap between casing member 87 and the outer surface of back plate 62. The combination of air flowing past the exposed surfaces of brake 61 and through the interior ducts 64 thereof cools the brake and dissipates the heat of the braking action.

Although the foregoing invention has been described in some detail, by way of illustration and example for purposes of clarity of understanding, it is understood that certain changes and modifications may be practiced within the spirit of the invention and scope of the appended claims.

What is claimed is:

1. A brake disc assembly comprising a pair of annular face plates, radial vanes between said face plates spacing said plates apart parallel to each other, and defining with said face plates ventilating passageways, a blower and duct means for conducting air from said blower into the interior of said assembly and out through said passageways, said duct means comprising front and back members partially enclosing the exposed surfaces of said face plates, and a central member attached to said front member converging into a central opening of a first of said face plates.

2. An assembly according to claim 1, which further comprises a shaft, a hub fixed to said shaft, and mounting means mounting said hub on a second of said face plates with gaps between said hub and said face plates to permit substantially radial outward escape of air over the external surface of said second face plate.

3. An assembly according to claim 2, in which said front member is spaced parallel to said first face plate and said back member is spaced parallel to said second face plate whereby air is directed radially outward over the external surfaces of both said face plates.

4. An assembly according to claim 3, in which said front and back members are each segments of in excess of 180° of a circle having as its center the center of said shaft.

5. A brake disc assembly comprising a pair of annular face plates, radial vanes between said face plates spacing said plates apart parallel to each other, and defining with said face plates ventilating passageways, a blower and duct means for conducting air from said blower, one said annular plate having a central opening communicating outwardly with the end of said duct means opposite said blower and communicating inwardly with spaces between inner ends of said vanes whereby air is forced by said blower through said duct means into said central opening and thence outward through said ventilating passageways to cool said plates.

References Cited by the Examiner

UNITED STATES PATENTS

| | | | |
|---|---|---|---|
| 2,607,445 | 8/1952 | Rausenberger | 188—264 |
| 2,781,874 | 2/1957 | Gaylord | 188—264 |
| 2,792,091 | 5/1957 | Beck et al. | 188—264 X |
| 2,795,302 | 6/1957 | Gaylord | 188—264 |
| 2,823,897 | 2/1958 | Kellogg | 254—184 X |
| 2,948,483 | 8/1960 | Petersen | 242—54 |
| 3,101,912 | 8/1963 | Bartlett | 242—54 |

MERVIN STEIN, *Primary Examiner.*

MILTON KAUFMAN, *Examiner.*